United States Patent [19]
Boyd

[11] Patent Number: 5,267,925
[45] Date of Patent: Dec. 7, 1993

[54] EXERCISE DYNAMOMETER

[75] Inventor: Robert L. Boyd, Woodcliff Lake, N.J.

[73] Assignee: Boyd Control Systems, Inc., Woodcliff Lake, N.J.

[21] Appl. No.: 801,252

[22] Filed: Dec. 3, 1991

[51] Int. Cl.$^5$ ............... A63B 22/06; H02K 23/60; F16D 49/10
[52] U.S. Cl. .................................. 482/64; 482/5; 482/9; 482/903; 310/115; 188/77 R
[58] Field of Search .................. 482/63, 64, 1, 2, 6, 482/4, 7, 9, 54, 52, 72, 73, 900, 57, 5, 903; 310/77, 95, 97, 115, 116, 117; 188/77 R, 77 W

[56] References Cited

U.S. PATENT DOCUMENTS

| | | |
|---|---|---|
| 3,465,592 | 9/1969 | Perrine . |
| 3,501,142 | 3/1970 | Johansson ............... 482/64 |
| 3,848,467 | 11/1974 | Flavell . |
| 3,902,480 | 9/1975 | Wilson . |
| 4,082,267 | 4/1978 | Flavell . |
| 4,085,345 | 4/1978 | Bullat ................... 310/117 |
| 4,261,562 | 4/1981 | Flavell . |
| 4,601,468 | 7/1986 | Bond et al. . |
| 4,628,910 | 12/1986 | Krukowski . |
| 4,635,364 | 1/1987 | Noll et al. ............ 188/77 R |
| 4,691,694 | 9/1987 | Boyd et al. . |
| 4,709,917 | 12/1987 | Yang . |
| 4,726,582 | 2/1988 | Fulks . |
| 4,750,738 | 6/1988 | Dang . |
| 4,751,440 | 6/1988 | Dang . |
| 4,765,315 | 8/1988 | Krukowski . |
| 4,776,587 | 10/1988 | Carlson et al. . |
| 4,822,036 | 4/1989 | Dang . |
| 4,822,037 | 4/1989 | Makansi et al. . |
| 4,824,104 | 4/1989 | Bloch . |
| 4,842,274 | 6/1989 | Oosthuizen et al. . |
| 4,869,497 | 9/1989 | Stewart et al. . |
| 4,885,939 | 12/1989 | Martin . |
| 4,889,108 | 12/1989 | Bond et al. . |
| 4,934,692 | 6/1990 | Owens . |
| 4,934,694 | 6/1990 | McIntosh . |
| 4,941,652 | 7/1990 | Nagano et al. . |
| 4,947,069 | 8/1990 | Grant .................. 310/115 |
| 4,979,733 | 12/1990 | Prud'Hon . |
| 4,986,533 | 1/1991 | Lo . |
| 4,998,725 | 3/1992 | Watterson et al. . |
| 5,015,926 | 5/1991 | Casler . |
| 5,016,871 | 5/1991 | Dalebout et al. . |
| 5,020,794 | 6/1991 | Englehardt et al. . |
| 5,067,710 | 11/1991 | Watterson et al. ......... 482/64 |

OTHER PUBLICATIONS

IBM Technical Disclosure Bulletin on Speed Regulation, Jul. 1963, 310/117.

Primary Examiner—Richard J. Apley
Assistant Examiner—John P. Leubecker
Attorney, Agent, or Firm—Lerner, David, Littenberg, Krumholz & Mentlik

[57] ABSTRACT

An exercise machine utilizes a mechanical brake to provide the principal resistance. A dynamoelectric machine has its rotor connected to the flywheel of the exercise machine and its stator rotatably mounted to the apparatus frame and connected to the actuation input of the mechanical brake. The torque applied between the rotor and stator of the dynamoelectric machine tends to turn the stator and thus actuates the mechanical brake. A control system is arranged to control the current flow through the dynamoelectric machine and thereby control actuation of the brake. This allows a small dynamoelectric machine to effectively control a very large resistance. The dynamoelectric machine may also be used as a motor to drive the apparatus. Thus, the control system can actuate the dynamoelectric machine either to apply drag or to drive the apparatus thereby provided through constant speed operation.

20 Claims, 3 Drawing Sheets

EXERCISE DYNAMOMETER

BACKGROUND OF THE INVENTION

The present invention relates to exercise apparatus of the dynamometer type.

Exercise dynamometers are used in physical conditioning programs and in medical and scientific performance evaluations. A typical exercise dynamometer includes a work input element which can be manually moved by the person exercising on the apparatus. The work input element may include a set of pedals like those on a bicycle, a roller or belt which can be moved by running along surfaces, foot pads which can be moved by motion simulating skiing or stair climbing, hand cranks and the like. The work input element is linked to a motion element such as a flywheel, and some form of device for resisting movement of the motion element. For example, a simple bicycle type exercise dynamometer may have a flywheel, a set of pedals linked to the flywheel and a mechanical band brake for resisting rotation of the flywheel. The degree of resistance is set by adjusting the tension on the band, as by turning a screw to tighten a tension spring connected to the band.

U.S. Pat. No. 4,934,692 discloses a variant of this approach in which an electric motor is provided to adjust the band tension. The electric motor is controlled by a switch mounted on a hand crank used by the person performing the exercise, so that he or she can adjust the tension conveniently without interrupting the exercise. U.S. Pat. No. 5,016,871 discloses another device including an electric motor for tightening and loosening a brake band. Devices relying on manual control, whether applied by direct manual adjustment of the brake band or by manual actuation of an electric motor adjustment, provide only the crudest control of the exercise program. Accordingly, considerable effort has been devoted towards development of exercise apparatus with automatically controlled resistance.

U.S. Pat. No. 4,998,725 discloses a controller for an exercise machine such as a treadmill or stationary cycle which uses a microprocessor to vary resistance to the exerciser to regulate the user's heart rate. To vary the resistance in the stationary cycle embodiment, a motor geared to a shaft winds or unwinds a tension strap provided for the flywheel.

U.S. Pat. No. 4,824,104 discloses isokenetic exercise apparatus which uses frictional braking to provide constant speed exercise. The rotational speed of an exercise member generated by the user is mechanically compared to that of an axle which is rotated at a constant speed. The difference between these two rotational speeds is then translated into linear axial movement to thereby further apply or partially release braking resistance.

In U.S. Pat. No. 4,709,917 resistance to a brake wheel is varied by a solenoid. An iron core within the solenoid is linked to a lever so that movement of the core adjusts the resistance of the mechanical brake.

Another approach is to use an electrically controllable element directly to resist the force applied by the user and to dissipate the energy applied by the user. For example, U.S. Pat. No. 4,822,037 discloses an exercise dynamometer including an electric particle brake having a stator mounted to the frame of the apparatus and a rotor connected to the motion element driven by the user. The control system varies the current supplied to the electric particle brake, thereby varying the drag applied by the brake directly and providing control for the exercise program. U.S. Pat. Nos. 4,261,562; 4,082,267; 3,848,467; 4,822,036; and 4,750,738 all disclose use of a dynamoelectric machine such an electric motor or generator for controlling the speed of the apparatus and dissipating the energy input by the user. U.S. Pat. No. 4,842,274 discloses a variant of this approach in which a hydraulic clutch is interposed between the dynamoelectric machine and the movable element of the apparatus.

Systems which employ dynamoelectric machines capable of operation either as a motor or as a generator provide excellent control of the apparatus. However, apparatus of this nature suffers from a significant disadvantage in that the dynamoelectric machine must have significant power dissipation capacity. This in turn leads to a requirement for a large, heavy and expensive machine.

Accordingly, there are still needs for further improvement in exercise apparatus.

SUMMARY OF THE INVENTION

The present invention addresses these needs.

Exercise apparatus according to one aspect of the invention includes a frame and a main motion element movably mounted to the frame. The apparatus also includes work input means for moving the main motion element in a forward direction responsive to force supplied by a person using the apparatus. For example, the main motion element may be a wheel mounted for rotation on the frame and the work input means may include pedals, cranks or other devices enabling the user to drive the flywheel. The apparatus desirably also includes mechanical brake means having an actuation input element mounted to the frame for movement in an engage direction and in a release direction, the mechanical brake means being arranged to retard motion of the main motion element relative to the frame upon application of an engaging force urging the actuation input element in the engage direction.

Most perferably, the apparatus also includes a drag device having first and second elements movable relative to one another and also movable relative to the frame in first and second directions. The first element of the drag device is linked to the main motion element for movement therewith in the first direction upon movement of the main motion element in the forward direction. The second element of the drag device is connected to the actuation input element of the mechanical brake means so that movement of the second element in the first direction will cause movement of the actuation input element in the engage direction.

The drag device include means for controllably resisting movement of the first and second elements relative to one another. Thus, upon motion of the main motion element in the forward direction this controlled resistance will cause the second element to apply an engaging force urging the actuation input element in the engage direction. The apparatus most preferably further includes control means for controlling the resistance supplied by the drag device to thereby control the engaging force and control the degree of retardation applied by the mechanical brake means.

Most preferably, the first and second elements of the drag device are mounted to the frame for rotation about a common axis. In this case, the first and second directions are directions of rotation about this common axis. Thus, the means for resisting relative movement of the first and second elements include means for applying a drag torque between the first and second elements. The drag torque urges the second element in the first direction of rotation, and thus actuates the mechanical brake. The drag torque also urges the first element in the second direction of rotation, and hence directly retards forward motion of the main motion element.

Most desirably, the drag device includes a dynamoelectric machine such as an electric generator. The terms "rotor" and "stator" are commonly used to refer to the elements of a dynamoelectric machine. In apparatus according to preferred embodiments of the present invention, both the rotor and the stator of the dynamoelectric machine are rotatable, relative to the frame, about the common axis of the dynamoelectric machine. Typically, the rotor is linked to the main motion element or flywheel of the apparatus, whereas the stator is connected to the actuation input element of the mechanical brake and mounted to the frame by bearings or the like so that the stator can also rotate, over a limited range of motion, relative to the frame.

In an arrangement using a generator, the generator serves as a variable resistance torque transmitting element. The control system may adjust current flow through the windings of the generator, as by adjusting a variable resistance in series with the winding, to vary the torque transmitted through the generator, and hence vary the force supplied to the actuation input element of the mechanical brake. This in turn controls the resistance supplied by the mechanical brake. The control system can readily regulate the braking action of the mechanical brake by adjusting the resistance of the control drag device or dynamoelectric machine. Although the generator typically dissipates a small amount of the energy input by the user, the mechanical brake typically dissipates the great majority of the energy. The control drag device or dynamoelectric machine need only have sufficient capacity to transmit the torque for actuating the mechanical brake. Therefore, the generator used as the control drag device may be compact and inexpensive. In preferred forms of the apparatus, the energy dissipated in the dynamoelectric machine or control drag device is used to power the control system, so that the entire apparatus can be used without connection to an external power supply, and without the need for replaceable storage batteries or the like.

The control system may be arranged to detect speed of motion and control the drag device so as to maintain a substantially constant speed. Thus, the control means may be arranged to actuate the drag device when the speed exceeds a setpoint value. The control system may include feedback signal means for detecting the voltage induced in the winding of the dynamoelectric machine and providing a feedback signal representing the speed of the main motion element responsive to this induced voltage. This feedback signal means may include means for compensating for the effects of internal resistance in the winding on the induced voltage so as to maintain a substantially constant relationship between the feedback signal and the speed of motion substantially independent of current flow through the winding.

According to a further aspect of the invention, the dynamoelectric machine used as the drag device may be selectively operable either in a drag mode or in a motoring mode. In the drag mode, the dynamoelectric machine applies the drag torque between the first and second element (between the rotor and the stator) as aforesaid. In the motoring mode, the dynamoelectric machine applies a motoring torque between the first and second elements in the direction opposite to the direction of the drag torque. That is, the motoring torque tends to turn the first element or rotor of the dynamoelectric machine in the first direction, co-directional with the direction of motion imparted by movement of the main motion element or flywheel in the forward direction. Thus, the motoring torque applied to the first element of the dynamoelectric machine tends to drive both the first element of the dynamoelectric machine and the main motion element or flywheel of the apparatus in the forward direction. The motoring torque urges the second element or stator in the second direction, and hence moves the actuation element of the mechanical brake means in the release direction. Thus, application of the motoring torque both releases the mechanical brake and urges the main motion element in the forward direction. The control system can actuate the apparatus to provide either controlled resistance or controlled drive to the main motion element or flywheel.

This aspect of the invention incorporates the realization that, because the power required to drive the main motion element when the mechanical brake is released is small, even a small control dynamoelectric machine can provide sufficient power for this purpose. Stated another way, the apparatus according to this aspect of the invention uses the drag device in conjunction with the mechanical brake means to provide high power dissipation capacity in the drag mode, and uses the drag device or dynamoelectric machine by itself to drive the apparatus, with only modest power, in the motoring mode.

Preferred apparatus according to this aspect of the invention can provide true isokenetic operation under all conditions of user input provided that the control system is arranged to sense speed and to control the dynamoelectric machine so as to maintain constant speed of motion of the main motion element. Preferred devices according to this aspect of the invention can maintain constant speed without relying on the momentum of the main motion element. Therefore, the main motion element or flywheel itself may be light, compact and inexpensive. The ability to use both a compact dynamoelectric machine and a compact flywheel is particularly desirable.

In another preferred form of the invention, the control system may include means for determining the power being applied by the user and operating the drag device so as to maintain a constant power input level. That is, where the power applied by the user is too great, the drag device may be actuated to reduce the drag torque and/or to apply motoring torque. The ability to provide true constant power exercise with only a small, lightweight and inexpensive dynamoelectric machine is a particularly significant benefit. True constant power exercise programs can be used for example in rehabilitation medicine and in scientific measurements of human performance, as well as in conventional physical conditioning programs.

These and other objects, features and advantages of the invention will be more readily apparent from the detailed description of the preferred embodiments set forth below, taken in conjunction with the accompanying drawings.

DETAILED DESCRIPTION OF THE PREFERRED EMBODIMENTS

Figure 1:
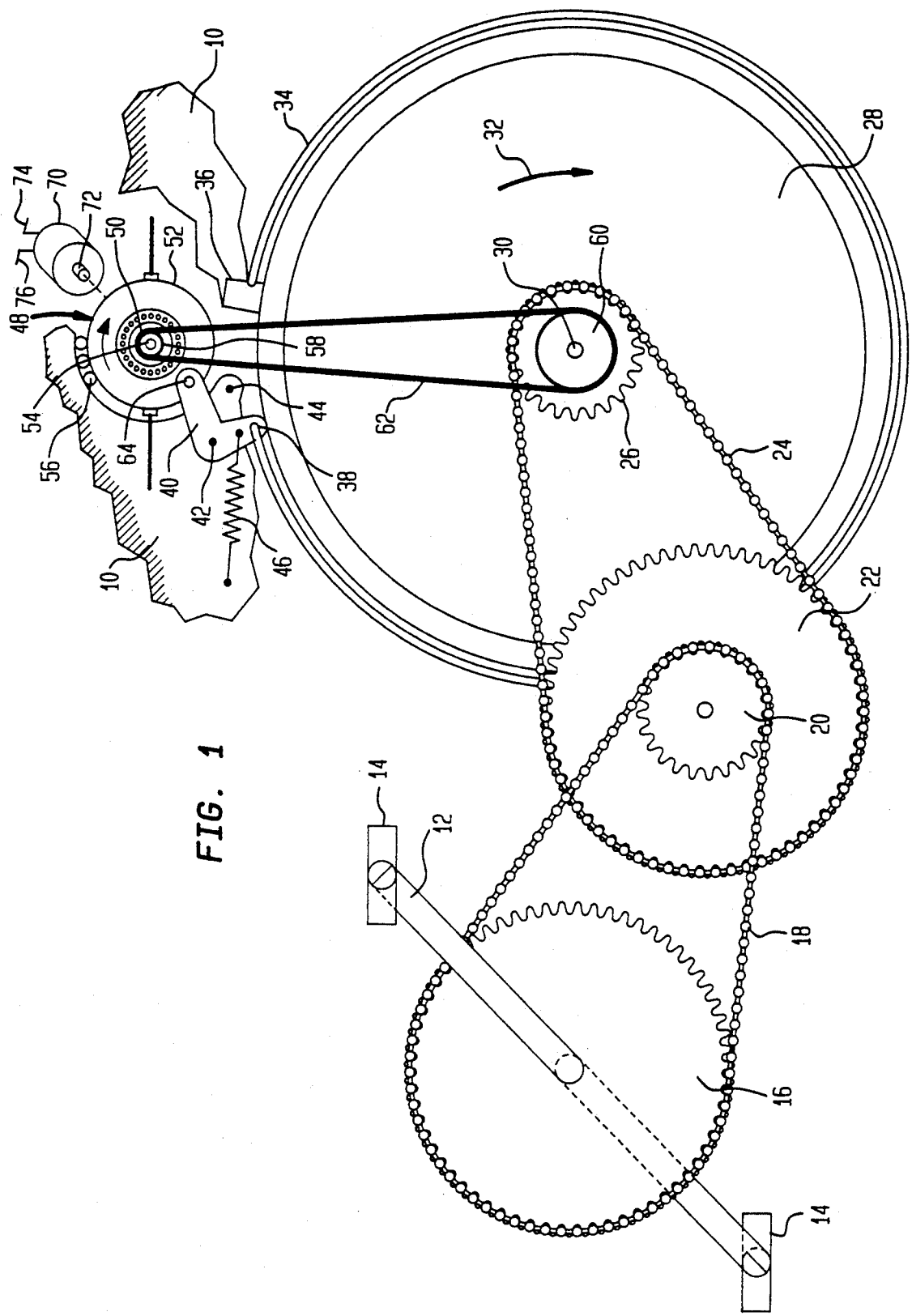
FIG. 1 is a diagrammatic view depicting the mechanical components utilized in apparatus according to one embodiment of the invention.

As illustrated in FIG. 1, apparatus in accordance with one embodiment of the invention includes a frame or base 10 and a work input element in the form of a crank 12 and pedals 14, crank 12 being rotatably mounted to frame 10. For clarity of illustration, portions of frame 10 are omitted in FIG. 1. The frame may have a seat or other support (not shown) for the person using the apparatus. A sprocket 16 is connected to crank 12 for rotation therewith and linked via a first drive chain 18 to a further, smaller sprocket 20. Sprocket 20 is coaxial with a further sprocket 22 and fixed thereto, these sprockets also being rotatably mounted to frame 10. Sprocket 22 is engaged with a second drive chain 24 which in turn is engaged with a final drive sprocket 26.

A flywheel or main motion element 28 is mounted coaxially with final drive sprocket 26 and fixed thereto. Final drive sprocket 26 and flywheel or main motion element 28 are mounted to frame 10 for rotation about a main wheel axis 30. The sprockets and drive chains are connected to one another so that a user may impel flywheel 28 in a forward direction of rotation, which is the clockwise direction indicated by large arrow 32 in FIG. 1.

The apparatus further includes a mechanical brake having a band 34 encircling flywheel 28. One end 36 of band 34 is fixed to frame 10. The opposite end 38 of the band is connected to an actuating lever 40. Lever 40 is pivotally mounted to frame 10 for movement about a pivot axis 42 parallel to main wheel axis 30. Pivoting movement of lever 40 in an engage direction, counterclockwise as seen in FIG. 1, tends to pull end 38 of the band to the right, thus tightening the band about the periphery of flywheel 28. Movement of actuation lever 40 in the engage direction is limited by band 34. Movement of lever 40 in an opposite, release direction, clockwise as seen in FIG. 1, releases band 34 from engagement with flywheel 28. A stop pin 44 fixed to frame 10 limits the range of motion of actuation lever 40 in the release or clockwise direction, but permits sufficient motion in this direction to fully release band 34 from engagement with flywheel 28. A spring 46 is connected between frame 10 and actuation lever 40, and biases the actuation lever in the release or clockwise direction.

The apparatus further includes a dynamoelectric machine or generator 48. Generator 48 has a rotor or first element 50 and a stator or second element 52. Rotor 50 is rotatable with respect to stator 52 about a common axis 54 parallel to the main wheel axis 30. Moreover, stator 52 is mounted to frame 10 by bearings schematically indicated at 56, so that the stator or second element 52 of the generator is also rotatable with respect to the frame about common axis 54. A small drag drive sprocket 58 is fixed to rotor or first element 50 for rotation therewith. A large drag drive sprocket 60 is fixed to flywheel 28 for rotation therewith about main wheel axis 30.

A drag drive chain 62 interconnects sprockets 58 and 60 so that the rotor or first element 50 of generator 48 is linked to the main motion element or flywheel 28 for movement therewith. Thus, upon movement of flywheel 28 in the forward or clockwise direction, the first element 50 of generator 48 will be moved in a first direction of rotation about common motor axis 54. This first direction is the clockwise direction as seen in FIG. 1. The second element or stator 52 of motor 48 is linked to the actuation lever 40 by a pin 64 engaged in a slot in lever 40 so that rotation of stator 52 in the first or clockwise direction as seen in FIG. 1 will move actuation lever 40 in the engage or counterclockwise direction, whereas rotation of stator or second element 52 in a second direction, counterclockwise as seen in FIG. 1, will move the actuation lever 40 in the release direction, clockwise as seen in FIG. 1 about pivot axis 42.

Figure 2:
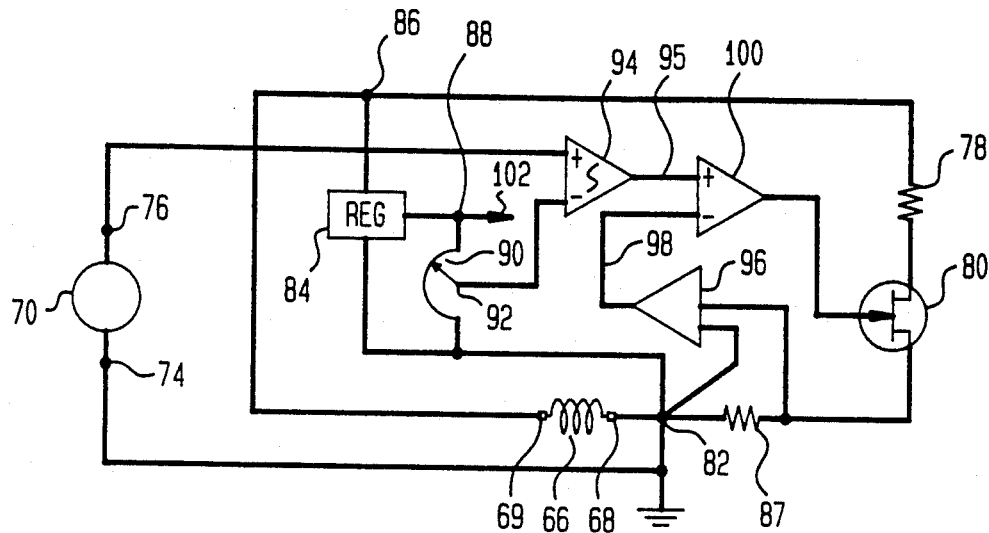
FIG. 2 is an electrical circuit diagram of the apparatus depicted in FIG. 1.

The generator or dynamoelectric machine 48 has an internal winding 66 (FIG. 2) connected to the remainder of the electrical circuit shown in FIG. 2 via slip ring terminations 68 and 69. A tachometer generator 70 is also mounted to frame 10. Tachometer generator 70 has an input shaft 72 mechanically connected to the rotor 50 of drag generator 48 and hence mechanically connected to flywheel 28 for rotation therewith. Tachometer generator 70 has a pair of output terminals 74 and 76. The tachometer generator is arranged to produce an output voltage across these terminals which is directly related to the speed of rotation of shaft 72 and hence directly related to the speed of rotation of flywheel 28.

As best seen in FIG. 2, a first terminal 68 of the winding 66 in the drag generator or dynamoelectric machine 48 is connected to a ground or reference node (82), whereas the other terminal 69 is connected to a machine voltage node 86. A variable resistance structure including a fixed resistor 78 and a field effect transitor ("FET") 80 having its source and drain in series with the fixed resistor is connected in series with a low-value sensing resistor 87 between nodes 86 and 82, so that the variable resistance structure is in series with winding 66. A regulated voltage source 84 is connected between node 86 and reference node 82. Regulated voltage source 84 is arranged to accept unregulated voltage between these nodes and provide a substantially fixed output voltage at a control voltage node 88. The fixed element 90 of a potentiometer is connected between control voltage node 88 and reference node 82. The potentiometer has a wiper 92 which can be moved along fixed element 90 so as to provide variable resistances between wiper 92 and node 88 and between wiper 92 and reference node 82, thereby providing a manually adjustable reference voltage on wiper 92.

The reference voltage source or wiper 92 is connected to one input of a difference amplifier and integrator 94. The other input of amplifier and integration 94 is connected to an output terminal 76 of tachometer generator 70. The remaining terminal 74 of tachometer generator 70 is connected to reference node 82. Difference amplifier 94 is arranged to provide a difference signal representing the difference between the voltage produced by tachometer generator 70 and the reference voltage appearing at source 92, and to integrate that difference signal to yield an integrated speed error signal on an output line 95. A current-sensing amplifier 96 has inputs connected to opposite end of sensing resistor 87, so that amplifier 96 produces an instantaneous current signal voltage on line 98 proportional to the instantaneous current through sensing resistor 87. The Outputs 95 and 98 of difference amplifier 94 and current-sensing amplifier 96 are connected to opposite inputs of a comparator 100. Comparator 100 is arranged to switch FET 80 to an "on" state in which the source to drain resistance of FET 80 is essentially zero whenever the voltage on line 95 exceeds the voltage on line 98, and to switch FET to an "off" state in which the source to drain resistance of FET 80 is approximately infinite whenever the voltage on line 98 exceeds the voltage on line 95. The active electronic components of the system (amplifiers 94 and 96, and comparator 100) draw power for operation from the control voltage node 88 of the power supply 84 via power connections, symbolically shown at 102.

In operation, actuating lever 40 is initially held against stop 44 by spring 46, so that band 34 is fully released from flywheel 28. As the user supplies energy through pedals 14, the speed of flywheel 28 increases. As the flywheel turns in the forward direction, rotor 50 spins in the first or clockwise direction about common axis 54. As the rotor 50 spins in the first or clockwise direction, a voltage is induced in winding 66 between nodes 82 and 86, This voltage is supplied to the power input terminals of regulated voltage source 84, allowing the power supply and potentiometer to generate a reference voltage at potentiometer wiper 92. While main motion element or flywheel 28 is moving at a relatively slow speed, the tachometer 70 generates only a relatively low voltage, less than the reference voltage appearing on potentiometer wiper 92. Accordingly, the integrated speed error signal voltage appearing at the output 95 of integrating amplifier 94 is negative. In this condition, FET 80 is off, and the instantaneous-current signal voltage on output line 98 is approximately zero. Accordingly, comparator 100 maintains FET 80 off. There is essentially no current flow through series connected resistor 78 and FET 80. Regulated voltage source 84 takes only a very small current through node 86. Accordingly, the total current flow through the winding 66 of the motor is very low. In this condition, the magnetomotive drag torque between rotor 50 and stator 52 is also very low, so that the stator 52 does not move actuation lever 40 from its release position, and brake band 34 remains released.

As the speed of rotation of wheel 28 increases, the voltage produced by tachometer 70 likewise increases, and hence the speed error signal appearing at amplifier output 95 becomes positive and greater than the instantaneous current signal voltage on line 98. Comparator 100 switches FET 80 to the on mode, whereupon the impedance in series with winding 66 decreases and a substantial current flow through the winding 66 of the generator increases. As the current increases, the instantaneous current signal line 98 also increases. The rate of increase of current through winding 66 is controlled principally by the self-inductance of the winding. After a short time, however, the current increases to the point where the instantaneous-current signal on line 98 exceeds the speed-error signal on line 95, whereupon comparator 100 turns FET 80 off. The current through the windings, and hence the instantaneous-current signal on line 98 drops again to zero, whereupon comparator 100 again turns FET 80 on and the cycle repeats. The maximum current attained on each cycle is directly related to the magnitude of the speed-error signal on line 95. The time-average current during such cyclic operation varies directly with the speed-error signal.

As the average current flow in the winding 66 increases, the magnetomotive drag torque applied between rotor 50 and stator 52 also increases. This magnetomotive drag torque tends to urge the stator 52 in the first direction of rotation, clockwise as seen in FIG. 1, and hence tends to move the actuation lever 40 in the engage direction and to pull band 34 against flywheel 28. The band retards the forward motion of the flywheel to a degree directly related to the magnitude of the drag torque. The magnetomotive torque also has a direct retarding effect. That is, the drag torque applied between stator 52 and rotor or first element 50 tends to urge the rotor in the second or counterclockwise direction thereby directly retarding the clockwise rotation of the rotor 50 and sprocket 60 and hence retarding the forward rotation of flywheel 28. However, this effect normally is small compared to the effect of band 34. The magnetomotive torque applied through actuating lever 40 exerts a force on band 34. If the distance between pivot axis 42 and the end of the lever attached to band end 38 is less than the distance between pivot axis 42 and the pin joint 64, the lever will provide a force multiplying mechanical advantage. However, the principal force multiplying effect is provided by the self-actuating effect of band 34. With a given amount of tension applied at end 38, frictional engagement between wheel 28 and band 34 tends to pull the remainder of the belt tighter, so that the tension at end 36 is considerably higher that than at end 38. For all of these reasons, the retarding torque applied by the mechanical band brake responsive to a given magnetomotive drag torque is many times the retarding torque applied directly through sprocket 60. Stated another way, the mechanical band brake multiplies the drag torque applied by generator or dynamoelectric machine 48 many times over.

As will be appreciated, the apparatus begins applying retarding torque when the voltage produced by tachometer 70 exceeds the preset reference voltage appearing at potentiometer wiper 92 and hence begins applying retarding torque when the speed of main motion element or flywheel 28 exceeds a preset reference speed. The degree of retardation increases as the excess of the main motion element or flywheel speed over the preset reference speed increases and decrease as such excess decreases, falling to approximately zero at the preset reference speed. The apparatus thus tends to maintain the speed of the main motion element substantially constant when the user attempts to pedal faster than the preset reference speed. The apparatus reacts very quickly to changes in the speed of the main motion element. For example, as the user cranks the pedal through varying positions, the relationship between muscular effort expended by the user and torque imparted to the pedal shaft and hence to the main motion element 28 varies. At top dead center and bottom dead center positions of the pedals, the user is at a mechanical disadvantage, and hence applies little, if any, driving torque to the system. The main motion element therefore tends to slow down momentarily as the pedals pass through these positions. The control system reacts quickly enough to counteract these momentary variations in speed, by diminishing the retarding torque as the main motion element begins to slow and then increasing it once again as the pedals reach a position where the user has a mechanical advantage and hence applies greater torque. Therefore, the angular momentum of the flywheel 28 can maintain the speed substantially constant. Substantially less angular momentum is required to maintain the same degree of speed regulation during the pedal cycle than would be required with constant retarding torque.

Figure 3:
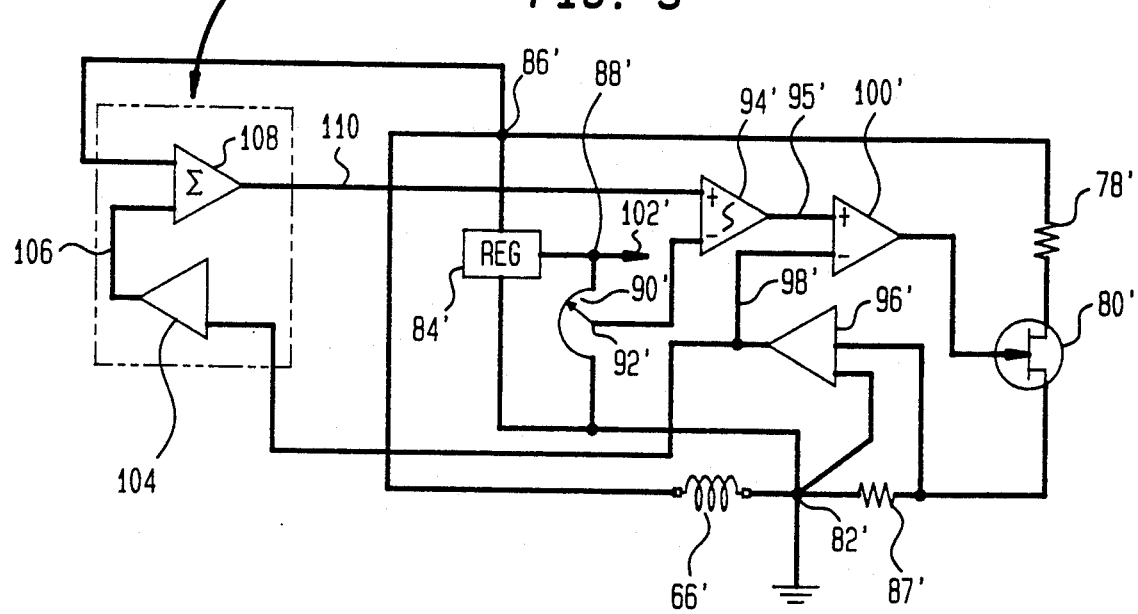
FIG. 3 is a circuit diagram similar to FIG. 2 but depicting apparatus in accordance with another embodiment of the invention.

The electrical circuit of apparatus according to a further embodiment of the invention is illustrated in FIG. 3. The apparatus of FIG. 3 is identical to the apparatus described above with reference to FIGS. 1 and 2 except that the tachometer generator 70 used in the embodiment of FIGS. 1 and 2 is omitted and replaced by a feedback signal circuit 103 arranged to derive a feedback signal representative of the speed of main motion element 28 directly from the voltage appearing on the winding 66' of the drag dynamoelectric machine or generator itself. The feedback signal circuit has a current compensation signal amplifier 104 connected to the instantaneous current signal output 98' of amplifier 96'. The output 106 of compensation amplifier 104 is connected to one input of a summing amplifier 108. The other input of summing amplifier 108 is connected to the generator voltage 86'.

The voltage across the windings of the generator winding is equal to the voltage induced in the windings minus the voltage drop through the windings due to the internal resistance of the windings. The induced voltage is substantially proportional to the rotation speed of the rotor or first element of the generator relative to the second element or stator. Inasmuch the stator can rotate only through a limited range, its rotational speed is negligible and hence the induced voltage in winding 66' is substantially proportional to the rotational speed of the rotor or first element relative to the frame and therefore proportional to the rotational speed of the flywheel. However, the voltage drop or loss through winding 66' is proportional to the instantaneous current in the winding and therefore varies continually as the system operates.

Circuit 103 compensates for the effect of the voltage drop, so as to produce a feedback signal on line 110 proportional only to the induced voltage. The current through sensing resistor 87' is substantially equal to the current in the windings, and hence the instantaneous current signal appearing at output 98' of current signal amplifier 96' is proportional to the current in the winding. The compensation signal at the output 106 compensation amplifier 104 is likewise proportional to the instantaneous current through the winding. The resistance of resistor 87' and the gains of amplifier 96' and 104 are selected so that the compensation signal on output 106 is equal in magnitude but opposite in sign to the voltage drop through the windings. Accordingly, when the compensation signal is added by summing amplifier 108 to the generator output voltage, the compensation signal will cancel out the voltage drop component of the generator output voltage. Accordingly, the feedback signal appearing on line 110 will be proportional only to the voltage induced in windings 66', without the resistance or loss component.

This signal is used in exactly the same way as the tachometer signal discussed above with reference to FIG. 2. As the FET 80' cycles on an off, self-inductance of the generator winding will cause positive and negative voltage surges at generator output node 86'. These will appear in the feedback signal, but will be cancelled in the integration process performed by integrating difference amplifier 94'. Stated another way, the feedback signal appearing on line 110 includes a speed component proportional to the voltage induced due to motion of the generator rotor, with some spurious surges caused by self-inductance of the winding. However, over any appreciable period of time the surges cancel one another. Therefore, the feedback signal on line 110, at least as a time average, is proportional to rotor speed.

Figure 4:
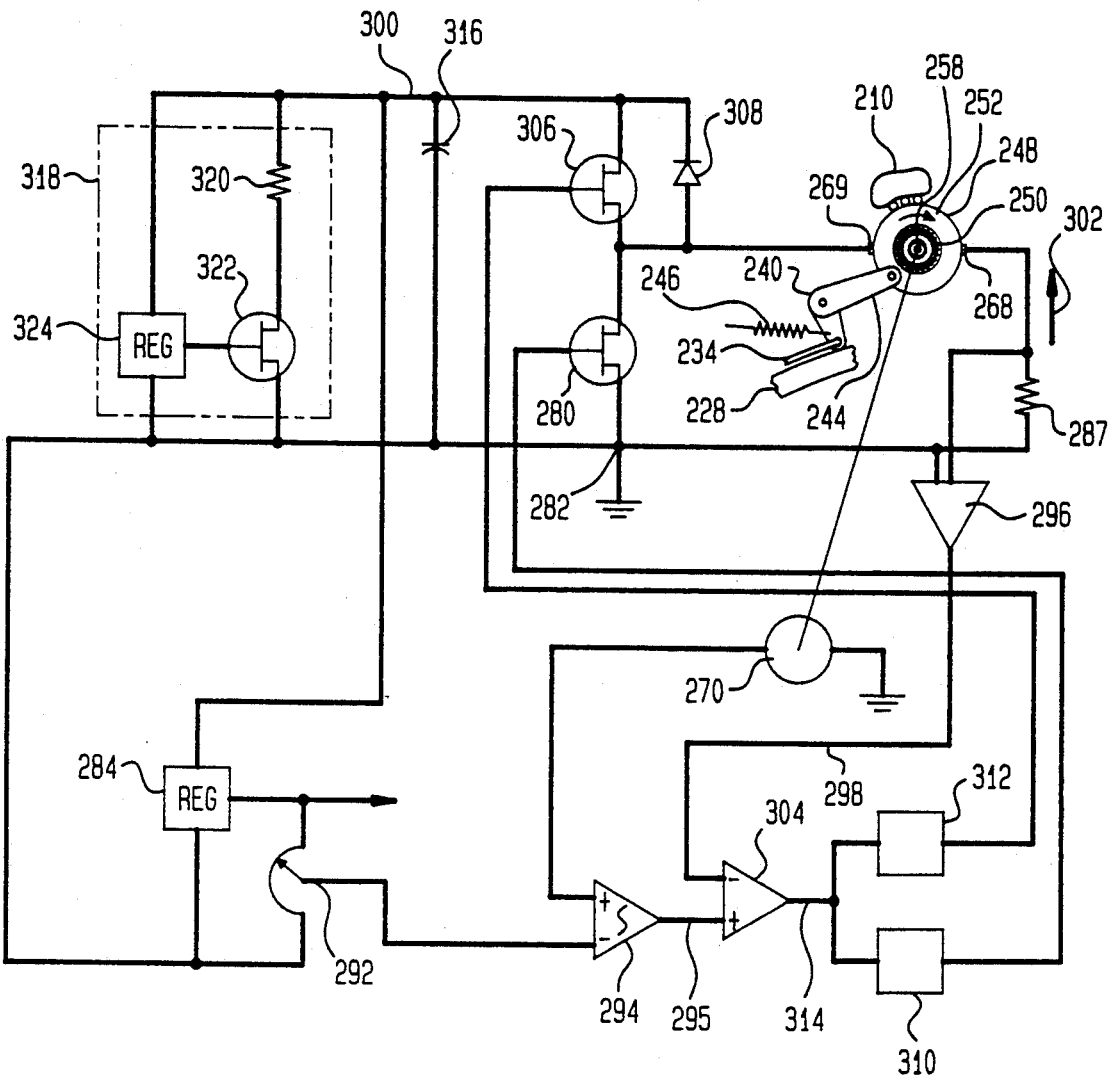
FIG. 4 is a combined mechanical and electrical diagram depicting apparatus in accordance with yet another embodiment of the invention.

The apparatus illustrated in FIG. 4 has a mechanical arrangement identical to that of FIG. 1. Thus, the drag drive sprocket 258 of the dynamoelectric machine 248 is connected via a drag drive chain (not shown) to a further sprocket which is mounted coaxially with the flywheel or main motion element 228 for rotation therewith. Thus, sprocket 258, and hence the first element or rotor 250 of the dynamoelectric machine 248 are connected to one another so that rotation of the flywheel 228 about its axis will cause rotation of a first element 250 and vice versa. For clarity of illustration, only a small portion of flywheel 228 is shown in FIG. 4. The stator or second element 252 of the dynamoelectric machine is mounted for rotation relative to the frame 210 of the apparatus, and linked to the actuation lever 240 of the mechanical band brake in the same manner as discussed above in regard to FIG. 1. A stop 244 limits the motion of the actuation lever in the release direction and hence limits the rotation of stator 252 in the second or counterclockwise direction as seen in FIG. 4. A spring 246 biases actuation lever 240 in the release direction. The rotation of stator 252 in the first or clockwise direction of rotation is limited by the band 234 of the mechanical brake and lever 240. A Tachometer generator 270 has an input shaft (not shown) linked to the first element or rotor of machine 248, and hence connected to the flywheel 228 for movement therewith.

Dynamoelectric machine 248 is capable of acting either as a motor or as a generator. When acting as a generator, with first element rotor 250 spinning in the first or clockwise direction of rotation, machine 248 will tend to cause a current flow in a generator current direction indicated by arrow 302. In this condition, the dynamoelectric machine acts exactly like the generator discussed above and exerts a drag torque urging second element or stator 252 in the clockwise or first direction of rotation and, consequently, urging the rotor or second element 250 in the second or counterclockwise direction. However, upon application of an externally applied motoring current in the opposite direction from that indicated by arrow 302, dynamoelectric machine 248 will act as a motor and will apply a motoring torque in the opposite sense from the drag torque. The motoring torque tends to turn the stator or second element 252 in the second or counterclockwise direction and urges the rotor or first element 250 in the first or clockwise direction.

The winding (not shown) of dynamoelectric machine 248 is connected in series with a sensing resistor 287 and drag control FET 280. Tachometer generator 270 produces a speed feedback voltage proportional to the speed of rotation of flywheel or main motion element 228. That voltage is supplied to one input of an integrating difference amplifier 294. The other input of amplifier 294 is connected to wiper 292 of a potentiometer, which in turn is fed by a regulated power supply 284. Power supply 284 in turn draws energy from a power bus 300. In the same manner as discussed above, integrating difference amplifier 294 will produce a speed error signal on an output line 295 which will be a positive voltage where the speed of rotation of main motion element or flywheel 228 exceeds a reference or set point speed determined by the setting of potentiometer 292. The speed error voltage will be negative when the speed of rotation of flywheel 228 is less than the set point speed.

A current signal amplifier 296 is connected across sensing resistor 287 so that amplifier 296 will produce an instantaneous current signal on output 298 proportional to the current passing through sensing resistor 287. Amplifier 296 is connected so that the instantaneous current signal voltage at output 298 will be positive for current flow in the drag direction (arrow 302) but negative for current flow in the opposite, motoring direction. The instantaneous current signal output 298 and the speed arrow signal output 295 are connected to opposite inputs of a comparator 304, so that the comparator will produce a current error signal on line 314. The current error signal will be either positive or negative depending upon the sign of the difference between the speed error signal on line 295 and the instantaneous current signal on line 298.

A motoring power FET 306 is connected between power bus 300 and one terminal 269 of dynamoelectric machine 248 so that power FET 306, the winding of dynamoelectric machine and sensing resistor 287 are in series between power bus 300 and the reference or ground node 282. A diode 308 is connected in parallel with motoring power FET 306.

The output 314 of comparator 304 is connected to the input of a drag actuator 310 and also connected to the input of a motoring actuator 312. Drag actuator 310 is arranged to maintain drag control FET 280 in the "on" or conducting state only when the signal on line 314 is positive and otherwise to maintain FET 280 in the off or non-conducting state. Motoring actuator 312 is arranged to maintain FET 306 in the on or conducting state only when the signal on line 314 is negative, and to maintain FET 306 in the off or non-conducting state under other conditions.

A storage capacitor 316 is connected between power bus 300 and reference node 312. A voltage limiter 318 is also connected between the power bus and the reference node. Voltage limiter 318 includes a resistor 320 in series with a further FET 322 and a controller 324. Controller 324 is arranged to switch FET 322 on and off repeatedly whenever the voltage on bus 300 exceeds a predetermined level. Here again, all of the active electronic components in the system draw their power from regulated power supply 284, which in turn draws its power from capacitor 316.

In operation, the system initially starts with capacitor 316 discharged. As power supply 284 is not energized, the active electronic components are also deenergized. Therefore, both FETs 280 and 306 are in the off or non-conducting state. As the person using the system applies work to the system through the work input element or pedals (not shown), flywheel or main motion element 228 begins turning in the forward direction, thus rotating the stator or first element 250 of dynamoelectric machine 248. The voltage induced in the windings charges capacitor 316 through diode 308. During this initial charging or startup period, there is a slight current flow through the windings of machine 248 in the drag direction, and hence a slight drag torque between the first element or rotor 250 and the second element or stator 252. However, this drag torque is insufficient to overcome the bias applied by spring 246, and hence spring 246 holds actuation lever 240 in the release position against stop 244, so that the mechanical brake is not applied. After a short period, the voltage on capacitor 316 rises to equal the voltage induced in the windings, so that even this so small drag torque disappears. During this startup period, the voltage on capacitor 316 rises to a level sufficient to energize regulated power supply 284, thus activating the active electronic components of the system.

In subsequent operation, integrating difference amplifier 294 combines the speed feedback signal from tachometer 270 with the reference signal from source 292 to produce a speed error signal on line 295. The speed reference signal will be positive when the speed of the main motion element exceeds the reference speed and negative when the speed is below the reference speed. Comparator 304 combines this speed error signal with the instantaneous current signal on line 298 to yield a positive or negative current error signal on line 314.

Where the speed of the main motion element exceeds the reference speed, the system operates similarly to the systems discussed above. In this condition, the speed error signal is positive. Provided that current of relatively small magnitude is flowing in the drag direction indicated by arrow 302 through sense resistor 287, the instantaneous-current signal from amplifier 296 will have a small positive value, less than the speed error signal. Accordingly, the current error signal produced by comparator 304 will be positive. Drag actuator 310 will maintain FET 280 on. The current in the drag direction through the dynamoelectric machine and hence through sense resistor 287 will increase, causing the positive instantaneous current signal on line 298 to increase until it equals the speed error signal on line 295, whereupon the current error signal on line 314 will go negative. Drag actuator 310 will switch drag FET off and motoring actuator 312 will switch motoring FET 306 on. The current flowing through the dynamoelectric machine in drag direction 302 thus is directed into storage capacitor 316, so that the voltage on the capacitor opposes the voltage generated by the dynamoelectric machine. The current flow in the drag direction thus decreases. As the current flow decreases, however, the energy stored in the self-inductance of the windings is liberated to provide a momentary additional voltage. Thus, the current flow in the drag direction continues for a short time and further charges capacitor 316. In this manner, capacitor 316 is charged to a voltage higher than the steady-state voltage generated by the dynamoelectric machine, i.e., higher than the voltage induced in the windings due to rotation of rotor 250.

As the energy stored in the self-inductance of the windings is dissipated, the current in the drag direction decreases until the instantaneous-current signal on line 298 is less than the speed-error signal on line 295. At this point, the signal from comparator 304 goes positive, causing motoring actuator 312 to switch motoring FET 306 off and causing drag actuator 310 to switch drag FET 280 on. The drag current increases again, and the cycle repeats. Thus, the system regulates the drag current around a positive value proportional to the speed error signal. As the drag current through the dynamoelectric machine has a substantial value, there is a substantial drag torque between the rotor of first element 250 and second element 252 of the dynamoelectric machine. This drag torque tends to turn the stator or second element 252 in the first or clockwise direction, and hence urges actuation lever 240 in the engaged or counterclockwise direction, thus engaging band 234 of the mechanical brake with the flywheel or main motion element 228 and hence retarding forward motion of that element in the same way as discussed above.

If the forward speed of the main motion element declines to less than the reference speed, the speed error signal on line 295 goes negative. In this condition, with zero or positive drag current flow, the current error signal on line 314 will also go negative, thus causing drag actuator 310 to turn the drag current FET 280 off and hence terminate any drag current. The negative current error signal also causes motoring actuator 312 to turn motoring FET 306 on, thus applying a motoring current from capacitor 316 through dynamoelectric machine 248 in the motoring direction, opposite to the direction of the drag current, i.e., opposite to the direction of arrow 302. The motoring current produces a negative instantaneous-current signal on line 298. Here also, the rate of current increase is limited by self-inductance of the windings. When the motoring current builds to a level where the negative instantaneous- current signal on the 298 is equal in magnitude to the negative speed error signal on 295, the current error signal on line 314 goes from negative to positive, whereupon motoring actuator 312 turns motoring current FET 306 off and drag current FET 280 on. Controller 312 turns drag FET 280 off and turns motoring FET 306 on, and the cycle repeats. Thus, the system pulse-modulates the motoring current applied to the dynamoelectric machine, and regulate the motoring current to a value proportional to the magnitude of the negative speed error signal.

The motoring current causes dynamoelectric machine 248 to produce a motoring torque in the sense opposite from the drag torque. The motoring torque tends to turn the stator or second element in the second or counterclockwise direction, thus urging actuating lever 240 in the release or clockwise direction so that the actuation lever rests on stop 244 and the band 234 of the mechanical brake is released. Also, the motoring torque tends to turn the rotor or first element in the first or clockwise direction. Because the motor is linked to the main motion element or flywheel, this tends to turn the flywheel in the forward direction, thereby increasing its forward speed. Thus, the system provides so called "two-quadrant" control. It applies drag torque to retard the main motion element when the main motion element speed exceeds the reference speed and impels the main motion element forward whenever the main motion element speed is less than the reference speed. The system accordingly can maintain the main motion element at substantially constant speed without relying entirely on the momentum of the main motion element. For both the motoring current and the drag current, the maximum magnitude of the current attained on each on/off cycle is determined by the magnitude of the speed error signal. Thus, the time average drag current increases directly with the excess of flywheel speed over reference speed. The time average motoring current is directly related to the magnitude of the deficiency of flywheel speed below the reference speed.

In the event that the person using the apparatus continually drives the main motion element faster than the set point speed, so that the system is always applying retarding torque, the charge on capacitor 316 will continue to increase. When the voltage on the capacitor reaches a preset level regulator 324 will turn FET 322 on and off rapidly, thus allowing the excess charge to dissipate through resistor 320 and protecting the system from undesirable overvoltages.

The system discussed above with reference to FIG. 4 stores energy generated by the dynamoelectric machine during application of the drag torque by "chopping" or pulsing the drag current and applying the voltage surges to the capacitor as discussed above. Thus, to maintain a charge on the capacitor, the person using the apparatus must apply some input power to the system, and must attempt to move the main motion element faster than the reference speed at least part of the time. That stored energy, of course, is used to provide the motoring power during other phases of operation. In some situations, such as in certain medical diagnostic testing applications, the person using the apparatus may be incapable of moving the main motion element fast enough to charge capacitor 316. Also, in biomedical testing or performance evaluation, it may be useful to have the apparatus accelerate the main motion element from a standing start to the reference speed, without relying on the person using the apparatus to provide the energy needed for such acceleration. For such situations, a source of external power such as an unregulated DC power supply may be connected between reference node 282 and power bus 300, so that the external power supply charges capacitor 316. A storage battery may be used for the same purpose. Capacitor 316 serves principally as an energy storage element. Other energy storage elements such as storage batteries may be substituted for the capacitor.

The systems discussed above control the speed of the main motion element responsive to a feedback signal representing speed so as to provide substantially constant speed for isokenetic of the main motion element. However, the control system can be altered to provide other desired forms of speed or work input control. The adjustable potentiometer used to provide the set point voltage and hence provide the set point or reference speed in the embodiments discussed above, can be replaced by a programmable controller which varies the set point speed with time according to a predetermined scheme. Likewise, the set point voltage can be varied in response to externally applied signals as, for example, a heart rate or other physiologic signal. Merely by way of example, the systems used for isokenetic operation may be arranged to adjust the set point to a lower speed responsive to a change in the heart rate of the person using the apparatus.

Figure 5:
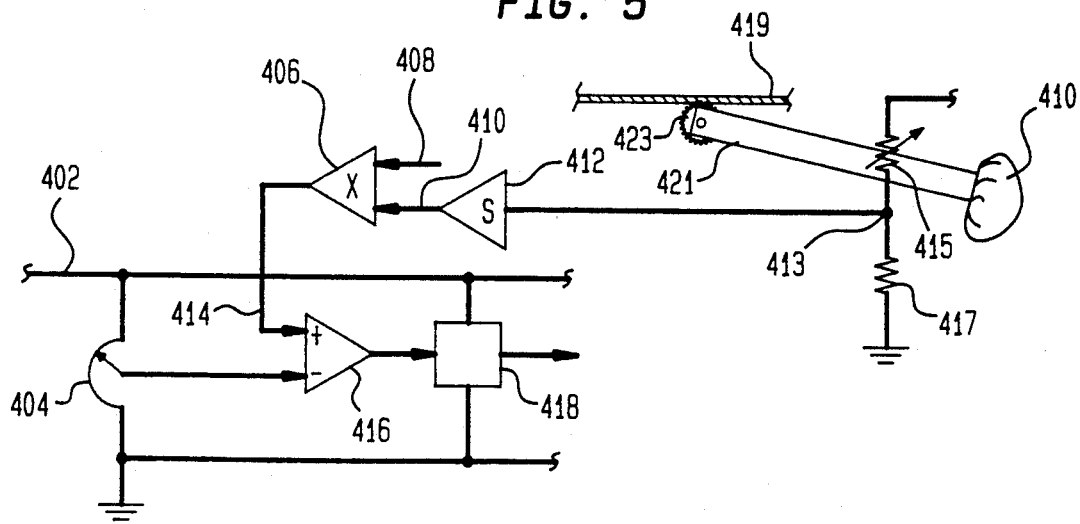
FIG. 5 is a fragmentary circuit diagram depicting portions of apparatus in accordance with yet another embodiment of the invention.

Alternatively, the system may employ a power-sensitive control scheme. A portion of such a system is illustrated in FIG. 5. The illustrated portion replaces the potentiometer 292 in the circuit of FIG. 4. The system includes a regulated power supply bus 402 and a potentiometer 404 to supply a power set point voltage. A multiplication circuit 406 has one input 408 connected to receive a speed feedback signal such as the tachometer signals discussed above, whereas the other input 410 is connected to an integrating amplifier 412.

The input of amplifier 412 is connected to the output node 413 of a strain gauge apparatus. The strain gauge apparatus includes a resistive strain gauge 415 and additional resistor 417 connected in series between the regulated power supply voltage and ground so that the voltage of node 413 varies depending on the resistance in gauge 415. Gauge 415 is bonded to a flexible tensioning element 421, which in turn carries a rotatable idler 423 in engagement with the first drive chain 419 of the apparatus. Drive chain 419 is linked to the pedal sprocket of the apparatus in the same way as drive chain 18 discussed above with reference to FIG. 1. Flexible element 421 is mounted to the frame 410 of the apparatus so that the deflection of the flexible element is related to the tension in chain 419 and hence to the torque applied to the pedals. The electrical resistance of gauge 415 changes with the deformation of element 421 so that the voltage of node 413 varies directly with torque applied to the pedals. Accordingly, amplifier 412 provides a signal on line 410 representing the torque applied to the pedals.

The product of the signal on line 408 and the torque signal on line 410, is a signal representing the amount of power being applied by the user. The power signal on line 414 is applied to the positive input of a summing amplifier 416, whereas the power set point signal from potentiometer 404 is applied to the negative input of that amplifier. The output from amplifier 416 thus constitutes a power error signal representing the difference between actual applied power and a set point power. The power error signal is applied to the control input of an electrically controllable voltage regulator 418. The output voltage from regulator 418 in turn is connected to the speed set point input of the controlled system as discussed above with reference to FIG. 4 in place of the set point speed connection from potentiometer 292, i.e., to the negative input of integrating difference amplifier 294.

Voltage controller 418 is arranged to vary the speed set point voltage applied to the remainder of the control system in response to variations in the power error signal. Thus, if the applied power signal on line 414 rises to above the power set point signal, the power error signal provided by amplifier 416 will go positive, whereupon voltage controller 418 will increase the speed reference voltage. Upon such an increase in the speed reference signal, the speed error signal provided by the speed difference integrating amplifier 294 (FIG. 4) goes negative, indicating that the present speed is less than the new setpoint speed. The remainder of the system reacts as discussed above by terminating application of the drag torque and applying a motoring torque to accelerate the system to a new, higher speed. The system thus effectively "runs away" from the user, thereby decreasing the user-applied power until the power reaches the set point. Conversely, where the user-applied power is too low, the power error signal from amplifier 416 will be negative, causing a decrease in the speed set point voltage from source 418, so that the new speed set point is less than the present speed. The remainder of the system will react as discussed above to terminate motoring torque and apply or increase the drag torque.

In a variant of this approach, the torque signal is obtained by a strain gauge or other transducer monitoring the tension in the brake band. In a further variant, the input of amplifier 412 is connected to receive the instantaneous current signal such as the signal on line 298 discussed above. Amplifier 412 is arranged to provide a positive signal responsive to current signals on line 298 representing a drag current, and to provide a negative signal responsive to current signals indicating a motoring current. The time average or integral of the drag current is directly related to the average drag torque and hence directly related to the degree of retardation applied to the main motion element. That is, the time average drag torque, and hence the signal from amplifier 412 is directly related to the torque resisting forward motion of the main motion element.

As will be readily appreciated, numerous variations and combinations of the features discussed above can be utilized without departing from the present invention as defined by the claims. In all of the systems discussed above, current is controlled by pulse modulation, through repeated switching of the controlling FET's. This arrangement is preferred because it causes essentially no power dissipation in the controlling FET's. However, the currents can be amplitude-modulated, as by progressively varying the source-to-drain impedance of the FET's in response to the current error signal. An array of resistors with switching elements responsive to different current error signal voltages can be used to provide stepwise-varying impedance. Manifestly, other elements such as conventional transistors or even vacuum tubes can be used to provide variable impedance. Also, the control systems utilized above can be replaced by voltage controlled oscillator type systems, in which the speed error voltage is applied to vary the frequency or duty cycle of a self-contained voltage controlled oscillator, and the signal from the oscillator is in turn used to control the drag current and/or motoring current FET directly. The analog control elements discussed above can be replaced by the equivalent digital elements such as discrete digital elements or an integrated microprocessor incorporating the functions of many such elements.

The particular arrangement of the main motion element actuation input element and dynamoelectric machine on parallel axes of rotation may be varied to orient these elements at any angle, provided the same are appropriately connected. Also, the band of the brake itself may be directly attached to the stator or second element of the dynamoelectric machine, so that the band serves as the actuation input element. The band brake may be replaced by other known forms of mechanical brakes including disk or drum brakes, hydraulic brakes or the like.

In those embodiments which do not require the dynamoelectric machine to act as a motor, such as the system of FIGS. 1 and 2, the dynamoelectric machine may be replaced by other electrically controllable drag elements. For example, a small magnetic particle brake having a rotatable first element, a rotatable second element, and particles disposed therebetween may be substituted for the generator or dynamoelectric machine of FIG. 1. A magnetic particle brake also includes a magnetic element arranged to direct a magnetic field through the particles and thereby vary the resistance or drag of the brake. In such an arrangement, the current would be supplied to the magnetic particle brake by an external source of power such as a main supply or battery, and can be controlled by substantially the same way as discussed above. Likewise, an eddy-current drag brake having a conductive disk or drum on one rotatable element and a coil on the other for inducing eddy currents in the conductive disk or drum upon relative rotation of the elements can be employed in place of the dynamoelectric machine. In the broad compass of the invention, the drag device may be non-electrical. For example, the generator or dynamoelectric machine may be replaced by a hydraulic or pneumatic pump such as a vane or piston pump connected in series with a controllable hydraulic or pneumatic resistance. Although the main motion element and the elements of the drag device discussed above move in rotary motion, the same principles can be applied to apparatus having elements using linear motion. Manifestly, the work input elements can be varied and can encompass any known type of element used in known exercise apparatus. For example, the work input elements can include hand cranks, pedals, treadmills such as belts and drums, stair climbing devices and essentially any other device which can be actuated by a user. As these and other variations and combinations of the features discussed above may be utilized without departing from the present invention, the foregoing description of the preferred embodiment should be understood by way of illustration rather than by way of limitation of the present invention as defined by the claims.

What is claimed is:

1. Exercise apparatus comprising:
   (a) a frame;
   (b) a main motion element movably mounted to said frame;
   (c) work input means for moving said main motion element in a forward direction responsive to force applied by a person using the apparatus;
   (d) mechanical brake means having an actuation input element mounted to said frame for movement in an engage direction and in a release direction for retarding motion of said main motion element relative to said frame upon application of an engaging force urging said actuation input element in said engage direction;
   (e) a drag device having first and second elements movable relative to one another and relative to said frame in first and second directions, said first element being linked to said main motion element for motion therewith in said first direction upon motion of said main motion element in said forward direction, said first and second elements of said drag device being mounted to said frame for rotation about a common axis, said first and second directions being directions of rotation about said common axis, said second element of said drag device being connected to said actuation input element of said mechanical brake means so that movement of said second element in said first direction will cause movement of said actuation input element in said engaged direction, said drag device including means for controllably resisting movement of said first and second elements relative to one another, whereby upon motion of said main motion element in said forward direction said means for controllably resisting will cause said second element to apply an engaging force urging said actuation input element in said engaged direction, said means for controllably resisting movement of said first and second elements relative to one another including means for applying a drag torque between said first and second elements so as to urge said second element in said first direction of rotation and urge said first element in said second direction of rotation; and
   (f) control means for controlling resistance applied by said drag device to thereby control said engaging force and the degree of retardation applied by said mechanical brake means.

2. Apparatus as claimed in claim 1 wherein said means for resisting movement includes means for applying a magnetic field between said first and second elements, and wherein said control means includes means for controlling said magnetic field.

3. Apparatus as claimed in claim 1 wherein said drag device includes a dynamoelectric machine selectively operable either to apply said drag torque or to apply a motoring torque urging said first element in said first rotational direction and urging said second element in said first rotational direction.

4. Apparatus as claimed in claim 3 further comprising source means for providing electrical energy to said dynamoelectric machine to produce said motoring torque.

5. Apparatus as claimed in claim 3 further comprising power sensing means for providing a feedback signal representing the power applied by a person using the apparatus, said control means being responsive to said feedback signal to control said dynamoelectric machine to apply said drag torque when the power applied is below a preselected power level and to apply said motoring torque when the power applied is above said preselected power level.

6. Apparatus as claimed in claim 1 wherein said main motion element includes a main wheel mounted to said frame for rotational movement about a main wheel axis, said actuation input element being movable relative to said frame over a preselected range of motion, said mechanical brake means further including a friction element connected to said actuation input element so that said friction element is moved into engagement with said wheel upon movement of said actuation input element in said engage direction and so that said friction element is released from said engagement with said main wheel upon movement of said actuation element in said release direction.

7. Apparatus as claimed in claim 6 wherein said friction element includes a band encircling said wheel.

8. Apparatus as claimed in claim 6 further compromising means for biasing said actuation input element in said release direction.

9. Apparatus as claimed in claim 6 wherein said mechanical brake means include means for providing a mechanical advantage so that upon application of an actuation force to said actuation input element, said friction element will be engaged with said wheel with a force greater than said actuation force.

10. Exercise apparatus comprising:
    (a) a frame;
    (b) a main motion element movably mounted to said frame;
    (c) work input means for moving said main motion element in a forward direction responsive to force applied by a person using the apparatus;
    (d) mechanical brake means having an actuation input element mounted to said frame for movement in an engage direction and in a release direction for retarding motion of said main motion element relative to said frame upon application of an engaging force urging said actuation input element in said engage direction;
    (e) a drag device having first and second elements movable relative to one another and relative to said frame in first and second directions, said drag device including a dynamoelectric machine having first and second terminals, said dynamoelectric machine being constructed and arranged so that said drag torque is directly related to current flow between said terminals, said first element being linked to said main motion element for motion therewith in said first direction upon motion of said main motion element in said forward direction, said first and second elements of said drag device being mounted to said frame for rotation about a common axis, said first and second directions being directions of rotation about said common axis, said second element of said drag device being connected to said actuation input element of said mechanical brake means so that movement of said second element in said first direction will cause movement of said actuation input element in said engage direction, said drag device including means for controllably resisting movement of said first and second elements relative to one another, whereby upon motion of said main motion element in said forward direction said means for controllably resisting will cause said second element to apply an engaging force urging said actuation input element in said engage direction, said means for controllably resisting movement of said first and second elements relative to one another including means for applying a drag torque between said first and second elements so as to urge said second element in said first direction of rotation and urge said first element in said direction of rotation; and (f) control means for controlling resistance applied by said drag device to thereby control said engaging force and the degree of retardation applied by said mechanical brake means, said control means including a circuit interconnecting said first and second terminals, said circuit including a variable impedance element.

11. Apparatus as claimed in claim 10 wherein said control means includes one or more active electronic devices, the apparatus further comprising means for supplying power generated by said dynamoelectric machine to said active electronic devices.

12. Apparatus as claimed in claim 10 wherein said control means further includes speed sensing means for providing a feedback signal representing the speed of motion of said main motion element and means for controlling said variable impedance element responsive to said feedback signal.

13. Apparatus as claimed in claim 12 wherein said means for controlling said variable impedance element includes means for pulse modulating the impedance of said variable impedance element.

14. Apparatus as claimed in claim 12 wherein said means for controlling said variable impedance element responsive to said feedback signal includes means for providing a reference signal, means for determining a difference between said feedback signal and said reference signal and means for controlling said variable impedance element responsive to said difference signal.

15. Apparatus as claimed in claim 12 wherein said dynamoelectric machine includes a winding on one of said first and second elements, said dynamoelectric machine is constructed and arranged so that a voltage will be induced in said winding upon relative movement of said first and second elements, said speed sensing means including feedback signal means for detecting the voltage induced in said winding and providing said feedback signal responsive to said induced voltage.

16. Apparatus as claimed in claim 15 wherein said means for providing a feedback signal includes means for compensating for the effects of internal resistance in said winding on said induced voltage so as to maintain a substantially constant relationship between said feedback signal and the speed of relative motion of said first and second elements, substantially independent of current flow through said winding.

17. Exercise apparatus comprising:
(a) a frame;
(b) a main motion element movably mounted to said frame;
(c) work input means for moving said main motion element in a forward direction responsive to force applied by a person using the apparatus;
(d) mechanical brake means having an actuation input element mounted to said frame for movement in an engage direction and in a release direction for retarding motion of said main motion element relative to said frame upon application of an engaging force urging said actuation input element in said engage direction;
(e) a drag device having first and second elements movable relative to one another and relative to said frame in first and second directions, said first element being linked to said main motion element for motion therewith in said first direction upon motion of said main motion element in said forward direction, said first and second elements of said drag device being mounted to said frame for rotation about a common axis, said first and second directions being directions of rotation about said common axis, said second element of said drag device being connected to said actuation input element of said mechanical brake means so that movement of said second element in said first direction will cause movement of said actuation input element in said engage direction, said drag device including means for controllably resisting movement of said first and second elements relative to one another, whereby upon motion of said main motion element in said forward direction said means for controllably resisting will cause said second element to apply an engaging force urging said actuation input element in said engage direction, said means for controllably resisting movement of said first and second elements relative to one another including means for applying a drag torque between said first and second elements so as to urge said second element in said first direction of rotation and urge said first element in said direction of rotation, said drag device including a dynamoelectric machine selectively operable either to apply said drag torque or to apply a motoring torque urging said first element in said first rotational direction and urging said second element in said first rotational direction; and (f) control means for controlling resistance applied by said drag device to thereby control said engaging force and the degree of retardation applied by said mechanical brake means, said control means including speed sensor means for detecting the speed of motion of said main motion element, actuating said dynamoelectric machine to apply said control drag torque when such speed is more than a set value and actuating said dynamoelectric machine to apply said motoring torque when said speed is less than said set value, said first element being connected to said main motion element so that said motoring torque will impel said main motion element in said forward direction.

18. Apparatus as claimed in claim 17 wherein said dynamoelectric machine is constructed and arranged to generate electrical energy during application of said drag torque, said source means including means for temporarily storing electrical energy generated by said dynamoelectric machine.

19. Exercise apparatus comprising:
    (a) a frame;
    (b) a main motion element movably mounted to said frame; said main motion element including a main wheel mounted to said frame for rotational movement about a main wheel axis, said main wheel axis being parallel to said common axis of rotation of said first and second elements, and wherein said actuation input element is pivotally mounted to said frame for pivoting motion about a pivot axis parallel to said main wheel axis and said common axis;
    (c) work input means for moving said main motion element in a forward direction responsive to force applied by a person using the apparatus;
    (d) mechanical brake means having an actuation input element mounted to said frame for movement in an engage direction and in a release direction for retarding motion of said main motion element relative to said frame upon application of an engaging force urging said actuation input element in said engage direction, said actuation input element being movable relative to said frame over a preselected range of motion, said mechanical brake means further including a friction element connected to said acutation input element so that said friction element is moved into engagement with said wheel upon movement of said actuation input element in said engage direction and so that said friction element is released from said engagement with said main wheel upon movement of said actuation element in said release direction;
    (e) a drag device having first and second elements movable relative to one another and relative to said frame in first and second directions, said first element being linked to said main motion element for motion therewith in said first direction upon motion of said main motion element in said forward direction, said first and second elements of said drag device being mounted to said frame for rotation about a common axis, said first and second directions being directions of rotation about said common axis, said second element of said drag device being connected to said actuation input element of said mechanical brake means so that movement of said second element in said first direction will cause movement of said actuation input element in said engage direction, said drag device including means for controllably resisting movement of said first and second elements relative to one another, whereby upon motion of said main motion element in said forward direction said means for controllably resisting will cause said second element to apply an engaging force urging said actuation input element in said engage direction, said means for controllably resisting movement of said first and second elements relative to one another including means for applying a drag torque between said first and second elements so as to urge said second element in said first direction of rotation and urge said first element in said second direction of rotation; and
    (f) control means for controlling resistance applied by said drag device to thereby control said engaging force and the degree of retardation applied by said mechanical brake means.

20. Exercise apparatus comprising:
    (a) a frame;
    (b) a main motion element movably mounted to said frame;
    (c) work input means for moving said main motion element in a forward direction responsive to force applied by a person using the apparatus;
    (d) mechanical brake means having an actuation input element mounted to said frame for movement in an engage direction and in a release direction for retarding motion of said main motion element relative to said frame upon application of an engaging force urging said actuation input element in said engage direction;
    (e) a drag device having first and second elements movable relative to one another and relative to said frame in first and second directions, said first element being linked to said main motion element for motion therewith in said first direction upon motion of said main motion element in said forward direction, said second element of said drag device being connected to said actuation input element of said mechanical brake means so that movement of said second element in said first direction will cause movement of said actuation input element in said engage direction, said drag device including means for controllably resisting movement of said first and second elements relative to one another, whereby upon motion of said main motion element in said forward direction said means for controllably resisting will cause said second element to apply an engaging force urging said actuation input element in said engage direction;
    (f) control means for controlling resistance applied by said drag device to thereby control said engaging force and the degree of retardation applied by said mechanical brake means; and
    (g) speed sensing means for providing a feedback signal representing the speed of motion of said main motion element, said control means being responsive to said feedback signal to control the resistance applied by said drag device and thereby vary the degree of retardation applied by said mechanical brake means so as to decrease said resistance when the speed of said main motion element is below a set speed and to increase said resistance when the speed of said main motion element is above said set speed.

* * * * *

UNITED STATES PATENT AND TRADEMARK OFFICE
CERTIFICATE OF CORRECTION

PATENT NO. : 5,267,925
DATED : December 7, 1993
INVENTOR(S) : Robert L. Boyd

It is certified that error appears in the above-indentified patent and that said Letters Patent is hereby corrected as shown below:

Column 17, line 67, after "means for" (first occurrence) insert --controllably--.

Signed and Sealed this

Third Day of May, 1994

*Attest:*

BRUCE LEHMAN

*Attesting Officer*   Commissioner of Patents and Trademarks